US011119859B2

(12) United States Patent
Dowlatkhah et al.

(10) Patent No.: US 11,119,859 B2
(45) Date of Patent: *Sep. 14, 2021

(54) METHOD AND APPARATUS FOR SUBSCRIBER MANAGEMENT

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/018,738

(22) Filed: Jun. 26, 2018

(65) Prior Publication Data

US 2018/0307566 A1 Oct. 25, 2018

Related U.S. Application Data

(63) Continuation of application No. 15/412,567, filed on Jan. 23, 2017, now Pat. No. 10,031,812, which is a
(Continued)

(51) Int. Cl.
*G06F 16/00* (2019.01)
*G06F 11/14* (2006.01)
(Continued)

(52) U.S. Cl.
CPC ...... *G06F 11/1451* (2013.01); *G06F 11/1458* (2013.01); *G06F 16/27* (2019.01);
(Continued)

(58) Field of Classification Search
CPC ............... G06F 15/177; G06F 16/9535; G06F 16/9577; G06F 16/951; G06F 16/68;
(Continued)

(56) References Cited

U.S. PATENT DOCUMENTS 5,828,959 A 10/1998 Soderbacka
5,915,220 A 6/1999 Chelliah
(Continued)

FOREIGN PATENT DOCUMENTS

EP 0605120 7/1994

OTHER PUBLICATIONS

Houssos, et al., "Advanced adaptability and profile management framework for the support of flexible mobile service provision,".
(Continued)

*Primary Examiner* — Shyue Jiunn Hwa
(74) *Attorney, Agent, or Firm* — Guntin & Gust, PLC; Jay H. Anderson

(57) ABSTRACT

Aspects of the subject disclosure may include, for example, a method including enabling, by a system comprising a processor, a first modification of a first user profile at a secondary data repository of a communication network; the first modification is directed by a first application operating at a first communication device of the communication network. A usage event is identified that is associated with the first communication device according to the first modification to the first user profile. A second modification to a second user profile is replicated at a primary data repository according to a change in operation of a second application associated with the usage event that is identified to the first communication device; the replication is performed according to an update policy for the primary data repository. Other embodiments are disclosed.

20 Claims, 7 Drawing Sheets

Related U.S. Application Data continuation of application No. 14/317,701, filed on Jun. 27, 2014, now Pat. No. 9,589,040.

(51) Int. Cl.
*H04L 29/08* (2006.01)
*G06F 16/27* (2019.01)

(52) U.S. Cl.
CPC ........ *H04L 67/1095* (2013.01); *H04L 67/306* (2013.01); *G06F 2201/80* (2013.01)

(58) Field of Classification Search
CPC .... G06F 16/29; G06F 16/635; G06F 16/2246; G06F 16/24575; G06F 16/24578; G06F 16/2477; G06F 16/248; G06F 16/3322; G06F 16/437; G06F 16/738; G06F 16/7867; G06F 16/90324; G06F 16/9537; G06F 19/328; G06F 19/3418; G06F 21/6227; G06F 21/6245; G06F 21/64; G06F 3/0236; G06F 3/0482; G06F 3/04886; G06F 40/205; G06F 9/4856; G06F 9/5072; G06F 16/134; G06F 16/1834; G06F 16/639; G06F 16/2379; G06F 16/955; G06F 16/958; G06F 16/972; G06F 16/986; G06F 21/6236; G06F 2221/2129; G06F 40/174; G06F 16/25; G06F 16/583; G06F 16/183; G06F 16/252; G06F 3/0481; G06F 3/0622; G06F 3/0673; G06F 9/4451; G06F 16/337; G06F 1/3231; G06F 3/011; G06F 3/016; G06F 3/04847; G06F 21/10; G06F 2221/0737; G06F 2221/2101; G06F 2221/2135; G06F 21/86; G06F 2221/2151; G06F 2221/2137; G06F 2211/007; G06F 2221/0797; G06F 16/23; G06F 16/285; G06F 3/0487; G06F 11/1451

See application file for complete search history.

(56) References Cited

U.S. PATENT DOCUMENTS

| | | | |
|---|---|---|---|
| 6,031,904 A | 2/2000 | An et al. | |
| 6,603,969 B1 | 8/2003 | Vuoristo et al. | |
| 6,804,716 B1 | 10/2004 | Koch et al. | |
| 6,810,259 B1 | 10/2004 | Zhang | |
| 6,917,819 B2 | 7/2005 | Collins | |
| 7,076,504 B1 | 7/2006 | Handel et al. | |
| 7,158,977 B2 | 1/2007 | Challener et al. | |
| 7,191,179 B2 | 3/2007 | Shaw | |
| 7,340,438 B2 | 3/2008 | Nordman et al. | |
| 7,379,737 B2 | 5/2008 | Kwan et al. | |
| 8,380,192 B2 | 2/2013 | Kim et al. | |
| 8,407,344 B2 | 3/2013 | Zabawskyj et al. | |
| 8,428,583 B2 | 4/2013 | Ruhanen et al. | |
| 8,538,421 B2 | 9/2013 | Brisebois et al. | |
| 8,683,554 B2 | 3/2014 | Martin et al. | |
| 8,719,366 B2 | 5/2014 | Mathew et al. | |
| 8,942,995 B1 | 1/2015 | Kerr et al. | |
| 9,135,348 B2* | 9/2015 | Wu | H04H 60/33 |
| 2002/0147766 A1 | 10/2002 | Vanska et al. | |
| 2006/0229090 A1* | 10/2006 | LaDue | H04W 84/04 455/507 |
| 2009/0138525 A1* | 5/2009 | Mattox, Jr. | G06F 16/27 |
| 2010/0138370 A1* | 6/2010 | Wu | H04H 60/46 706/12 |
| 2011/0246581 A1* | 10/2011 | Zhu | H04L 67/24 709/206 |
| 2012/0011551 A1* | 1/2012 | Levy | H04N 7/106 725/82 |
| 2012/0233103 A1 | 9/2012 | Ashrafi | |
| 2012/0324091 A9* | 12/2012 | Raleigh | H04L 41/5006 709/224 |
| 2014/0115488 A1* | 4/2014 | Hackborn | H04M 1/72427 715/741 |
| 2017/0132087 A1 | 5/2017 | Dowlatkhah et al. | |

OTHER PUBLICATIONS

Lankhorst, "Enabling technology for personalizing mobile services," Proceedings of the 35th Annual Hawaii International Conference on System Sciences, Jan. 7-10, 2002, p. 1464-1471.

Youssef, et al., "Preserving mobile customer privacy: an access control system for moving objects and customer profiles,".

Baumgart, et al., "Mobile semantic data exchange in ad hoc networks using distributed profiles," International Symposium on Wireless Pervasive Computing, Jan. 16-18, 2006.

Berhe, et al., "Modeling service-based multimedia content adaptation in pervasive computing," Proceedings of the 1st Conference on Computing Frontiers, 2004, p. 60-69.

Bokharouss, "A Location-Aware Mobile Call Handling Assistant," 21st International Conference on Advanced Information Networking and Applications Workshops, May 21-23, 2007, p. 282-289.

Chellouche, et al., "Flexible user profile management for context-aware ubiquitous environments," IEEE Consumer Communications and Networking Conference (CCNC), Jan. 9-12, 2010, p. 1-5.

Eleftheriadis, et al., "User profile identification in future mobile telecommunications systems," IEEE Network (Sep.-Oct. 1994) 8(5):33-39.

Feng, et al., "A Contextualized and Personalized Approach for Mobile Search," International Conference on Advanced Information Networking and Applications Workshops, May 26-29, 2009, p. 966-971.

Houssos, et al., "Advanced adaptability and profile management framework for the support of flexible mobile service provision," Aug. 2003, 2 pages.

Lankhorst, "Enabling technology for personalizing mobile services," Proceedings of the 35th Annual Hawaii International Conference on System Sciences, Jan. 7-10, 2002, p. 1464-147.

Radio, et al., "Next-Generation Applications on Cellular Networks: Trends, Challenges, and Solutions," Proceedings of the IEEE (Apr. 2012) 100(4):841-854.

Youssef, et al., "Preserving mobile customer privacy: an access control system for moving objects and customer profiles," May 26, 2014, 2 pages.

\* cited by examiner

100

200

300

METHOD AND APPARATUS FOR SUBSCRIBER MANAGEMENT

CROSS-REFERENCE TO RELATED APPLICATIONS

This application is a continuation of U.S. application Ser. No. 15/412,567, filed Jan. 23, 2017, which is a continuation of U.S. application Ser. No. 14/317,701, filed Jun. 27, 2014 (now U.S. Pat. No. 9,589,040), which are incorporated by reference herein in their entirety.

FIELD OF THE DISCLOSURE

The subject disclosure relates to a method and apparatus for subscriber management, and, more particularly, for dynamic updating of subscriber profile information.

BACKGROUND

Modern telecommunications systems allow consumers to utilize telephony capabilities while accessing a large variety of content. Consumers are no longer bound to specific locations when communicating with others or when enjoying content, including video programming Network capabilities have expanded and have created additional interconnections and new opportunities for using mobile communication devices in a variety of situations. Intelligent devices offer new means for the enjoyment of network interactions in ways that anticipate consumer desires.

BRIEF DESCRIPTION OF THE DRAWINGS

Reference will now be made to the accompanying drawings, which are not necessarily drawn to scale, and wherein.

DETAILED DESCRIPTION

Figure 1:
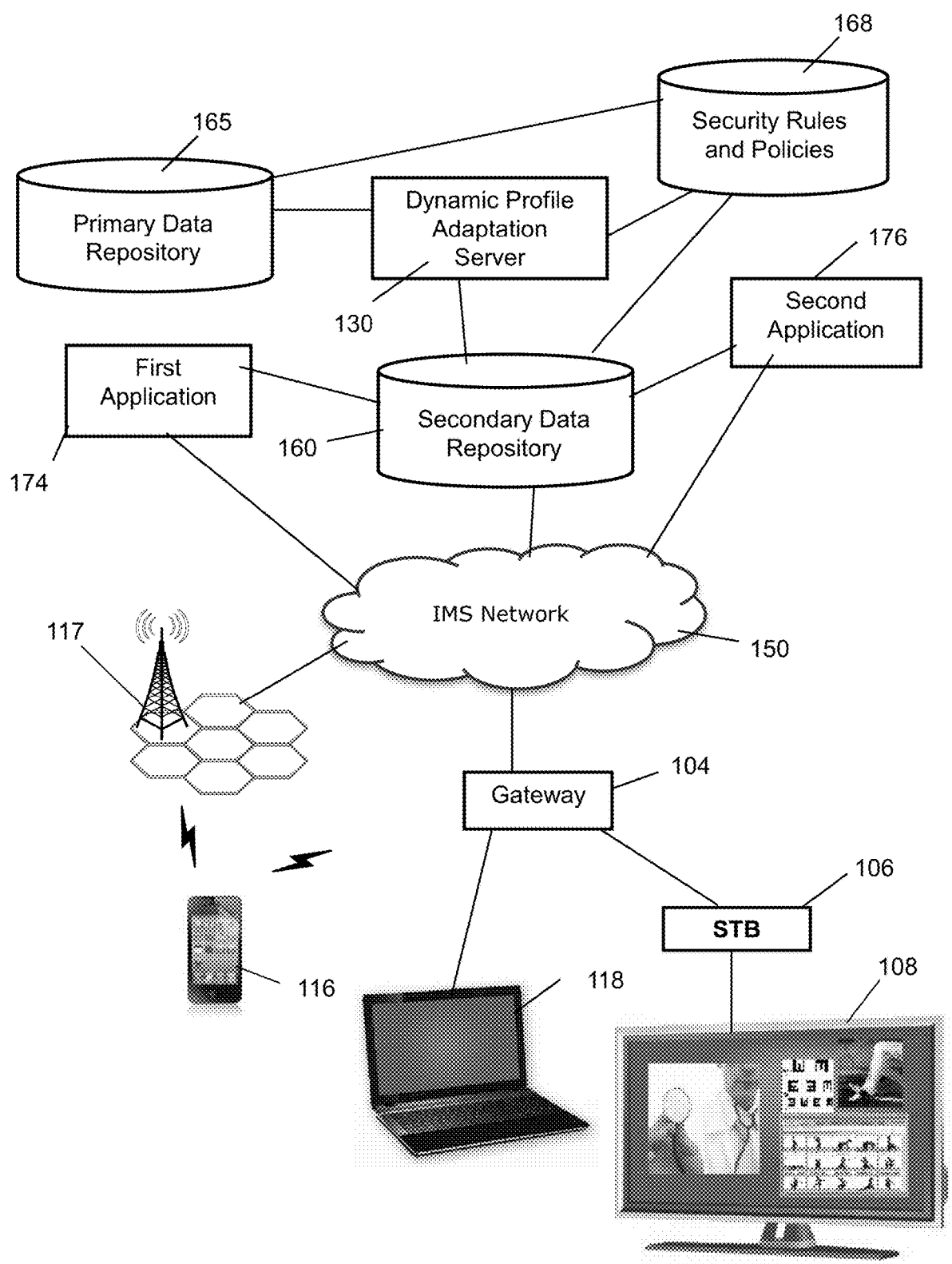
FIG. 1 depicts illustrative embodiments of a system that can be utilized for managing subscriber profile information for communication devices.

The subject disclosure describes, among other things, illustrative embodiments for dynamically configuring subscriber profile information in a communication system by enabling a modification to a subscriber profile associated with a communication device at a secondary data repository that is accessible to third party applications and identifying a usage event association with the communication device based on the modification made to the subscriber profile. The illustrative embodiments further describe modifying another user profile at the secondary data repository based on the usage event and replicating modifications to user profiles at a primary data repository that is not accessible to third party applications according to an update policy for the primary data repository. Other embodiments are described in the subject disclosure.

One embodiment of the subject disclosure includes a computer-readable storage device, comprising executable instructions. The executable instructions can cause a processor to perform operations comprising generating a copy of a first plurality of user profiles stored in a primary data repository of a communication network and storing the copy of the first plurality of user profiles in a secondary data repository of the communication network. The copy of the first plurality of user profiles can correspond to a second plurality of user profiles. The second plurality of user profiles can be accessible and adjustable by third party applications, while the first plurality of user profiles can be not accessible and not adjustable by the third party applications. The executable instructions can further cause the processor to perform operations comprising detecting a first modification of a first user profile of the second plurality of user profiles at the secondary data repository, wherein the first modification is directed by a first application operating at a first communication device of the communication network. The executable instructions can also cause the processor to perform operations comprising identifying a usage event that is associated with the first communication device according to the first modification to the first user profile and, in turn, determining a change in operation of a second application operating at a second communication device of the communication network based on the usage event that is associated with the first communication device. The executable instructions can cause a processor to perform operations comprising modifying a second user profile of the second plurality of user profiles of the secondary data repository according to the change in operation of the second application to generate a modified second user profile and, in turn, updating the first plurality of user profiles of the primary data repository according to the modified second user profile responsive to the modified second user profile conforming to an update policy of the primary data repository.

One embodiment of the subject disclosure includes a server device comprising a memory to store executable instructions and a processor. The processor, responsive to executing the executable instructions, can perform operations including detecting a first modification of a first user profile at a secondary data repository of a communication network, wherein the first modification is directed by a first application operating at a first communication device of the communication network. The processor can also perform operations comprising determining a change in operation of a second application based on the first modification for the first user profile and, in turn, modifying a second user profile at the secondary data repository according to the change in operation of the second application to generate a modified second user profile. The processor can further perform operations comprising updating a second user profile of a primary data repository according to the modified second user profile of the secondary data repository conforming to an update policy for the primary data repository.

One embodiment of the subject disclosure includes a method including enabling, by a system comprising a processor, a first modification of a first user profile at a secondary data repository of a communication network, wherein the first modification is directed by a first application operating at a first communication device of the communication network. The method can also include identifying, by the system, a usage event that is associated with the first communication device according to the first modification to the first user profile. The method can further include updating, by the system, a second user profile of a primary data repository according to a second modification associated with the usage event that is identified for the first communication device, wherein the updating conforms to an update policy for the primary data repository.

FIG. 1 depicts an illustrative embodiment of a system 100 that can be utilized for providing communication device via a communication network. In one or more embodiments, the system 100 can include a communication network 150. The system 100 can include a subscription telecommunication service, such as an Internet Protocol Multimedia Subsystem (IMS) network 150 for providing cellular/mobile communications, Internet access, and content to mobile communication devices 116 via a mobility network of mobile base stations 117. The system can include a subscription content service, such as an Internet Protocol Television (IPTV) network for providing media content to subscribers. The IPTV network can be part of a cable, satellite, or DSL-based media content delivery system. The media content can be any type of viewable content, such as broadcast television, cable or premium television, video on demand, or pay-per-view television. The IPTV network can deliver media content to media processing devices 106 and media display devices 108 at subscriber locations via gateway devices 104. In one or more embodiments, the system 100 can include wireless computer devices 118 that are connected to the communication network 150. For example, a wireless computer device 118 can be coupled to the communication network 150 via a gateway device 104.

In one or more embodiments, the system 100 can provide wired and wireless access to communication services and media services for mobile communication devices 116, computer devices 118, and media processor devices 106. For example, a mobile communication device 116 can communicate through the IMS network 150 via a cellular network including base stations 117 and/or a gateway device 104 using wireless communications. In various embodiments, the mobile communication device 116 can access Internet-based services via the IMS network 150. For example, the mobile communication device 160 can access the first application 174 and/or a second application 176. The first and second application 174 and 176 can be third-party services, such as social media sites, news sites, streaming media sites, service providers, service carriers, and/or search sites.

In one or more embodiments, the system 100 can incorporate functions of a service provider and/or network carrier for offering services of the provider/carrier and/or services from third parties. The system 100 can provide databases 160 and 165, which include a set of parameters for each subscriber to the system 100. For example, the system 100 can include a primary data repository 165 and a secondary data repository 160. The primary and secondary data repositories 165 and 160 can include subscriber and/or user profile information of a variety of types. These types can include personal identification information, demographic information, location information, subscription service information, device configuration information, and/or preference information. The user profile information that is stored in the primary and secondary data repositories 165 and 160 is used by the system 100 to provide consistent performance of the system 100 as user communication devices 116, 118, and 106 access services from and/or through the system 100. For example, when a mobile communication device 116 is powered on and registers to the IMS network 150, the IMS network 150 can access a data repository 160 to obtain profile information that is associated with the mobile communication device 116 and/or a user of the device 116. In addition, the IMS network 150 can access the data repository 164 profile information as the mobile communication device 116 access the services of the IMS network 150.

In one or more embodiments, the primary and secondary data repositories 165 and 160 can be utilized in a manner that provides security and accessibility for profile information. The primary data repository 165 can include all profile data for subscribers in the network 100 including services used by those subscribers. In one embodiment, the primary data repository 165 can be in the form of a Consolidated Network Repository (CNR) that includes subscriber profile data and rules and policies for accessing this information. In one or more embodiments the primary data repository 165 can be a restricted and confidential database that is accessible only via proprietary services within the IMS network 150. Third-party companies, such as the first and second applications 174 and 176, can have little or no direct access to the information at the primary data repository 165. By maintaining a strict limit on accessibility to the primary data repository 165, the system 100 can protect subscriber data from malicious acts such as hacker attacks and can ensure security and integrity of subscriber profiles and rights as well as reliable system performance. The primary data repository 165 can store user profile information associated with third-party applications 174, however, access to and modification of this profile information can be strictly limited.

In one or more embodiments, the second data repository 160 can provide a more accessible database for the system 100. For example the second data repository 160 can allow third-party applications 174 and 176 to access and/or modify user profile information in the database. And application programming interface (API) of the second data repository 160 can allow third-party applications 174 176 to perform standard database functions such as searching, accessing, modifying, editing, adding, and/or deleting user profile information that is associated with the third-party application. In one or more embodiments, secondary data repository 160 can be configured as a Shadow CNR for the system 100. The secondary data repository 160 can receive a copy of the profile information that is stored at the primary data repository 165. This approach allows the system 100 to maintain a permanent and secure set of user profile information at the primary data repository 165 while simultaneously maintaining an up-to-date version of the same user profile information at the secondary data repository 160 in a form that can be easily accessed and/or modify by third-party applications 174 and/or user devices 116, 118, and 106.

In one or more embodiments, the secondary data repository 160 can access rules and policies 168 that govern access and/or modification of the user profile information that is stored at the secondary data repository 160. Similarly, the primary data repository 165 can access rules and policies 168 for the restricted access and/or modification and/or replication of the secured user profile information stored at the primary data repository 165. In one or more embodiments, the system 100 can include additional data repositories that can be designated for specific services, third-party services, and/or users. These additional data repositories can receive replicated user profile information from the primary data repository 165.

In one or more embodiments, the system 100 can include a dynamic profile adaptation server 130, or simply, adaptation server 130. The adaptation server 130 can provide a policy of security function for monitoring and the policing modifications to user profile information performed at the secondary data repository 160. As application services 174, including third-party applications, modify user profile information associated with those applications, the information contained in the secondary data repository 160 can differ from that contained in the primary data repository 165. The adaptation server 130 can determine when modified user profile information should be imported back to the primary data repository 165.

In one or more embodiments, the adaptation server 130 can monitor modifications in user profile information at the second data repository 160 and determine from the application in use by communication device 116 and/or a context of service whether a usage event has occurred. For example, the adaptation server 130 can detect that a user profile associated with a communication device 116 has been modify by an application 176 that performs a navigation function using a global positioning satellite (GPS) signal. The adaptation server 130 can infer from the modification that the mobile communication device 116 is being moved from one location to another. From this inference, the adaptation server 130 can apply rules and policies 168 to determine if the modification to the user profile should be forwarded to the primary data repository 165 as a permanent change or should be confined to the secondary data repository 160 as a temporary change.

Figure 2:
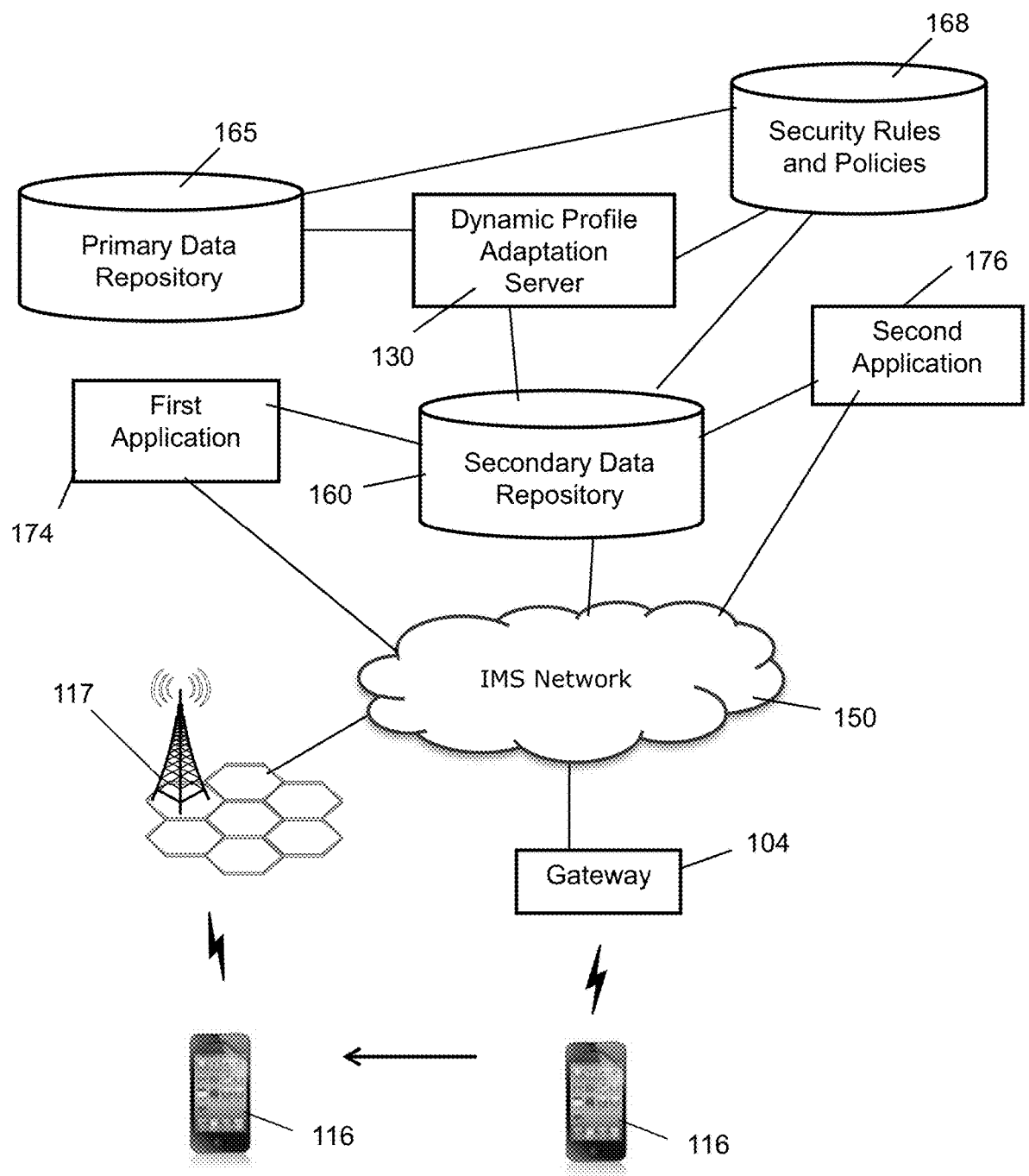
FIG. 2 depicts an illustrative embodiment of a scenario for dynamic updating of a subscriber profile.

In one or more embodiments, the adaptation server 130 can draw an inference from a modification in a user profile at the secondary data repository 160, where the inference strongly implies that an operating condition for the communication device 116 has changed. Referring to FIG. 2, for example, a mobile communication device 116 can at one point in time establish wireless communications to the IMS system 150 via a gateway device 104. At a later time, the mobile communication device 116 can be moved such that it can no longer communicate through the gateway device 104. Rather, the mobile communication device 116 can be communicating to the IMS system 150 via a cellular network 117. The IMS network 150 and/or an application 174 in communication with the mobile communication device 116 can detect the change in location of the device and or change in communication path of the device and can respond to this change by modifying user profile for major associated with the device. The modified user profile information can be stored at the secondary data repository 160 the adaptation server 130 can detect this change in user profile to draw an inference that a usage event has occurred, where the specific usage event is a transition in communication path of the mobile communication device 116. The adaptation server 130 can further draw an inference that the mobile communication device 116 moved from one location to another. In one embodiment the adaptation server can draw inferences based on modifications to user profile information at the secondary data repository 160. In another embodiment, the adaptation server 130 can draw inferences further based upon information that is independent of the second data repository 130, such as GPS information associated with the mobile communication device 116.

In one or more embodiments, modifications to user profile information at the secondary data repository 160 can directly indicate a usage event. For example a modification to user profile can directly indicate a change in user status, such as a change in name, age, location, subscription status, and/or device type or capability. The adaptation server 130 can monitor for such changes and determine directly the nature of a usage event. In other embodiments, modifications to user profile information at the secondary data repository 160 are inferential and may have to be combined with other contextual information in determining a usage event. For example, an application 174 can detect a change in communication path for a mobile communication device 116, as illustrated in FIG. 2, and can respond by modifying the user profile associated with login security for the application. The application 174 can, for example, alter a user profile configuration governing a maximum number of tries for logging into the application responsive to determining that the communication path has changed. The adaptation server 130 can detect the modification in the user profile information associated with the maximum number of tries for login and draw an inference of a usage event whereby the mobile communication device 116 has changed its communication to the IMS network 150.

In one or more embodiments, the adaptation server 130 can determine whether a modification in a user profile and/or a usage event inferred from a modification to user profile should result in an additional modification to a different user profile that is stored secondary data repository 160. For example, where the adaptation server 130 detects a modification in a maximum user login configuration associated with a first application 174, the adaptation server 130 can determine that a similar maximum user login configuration associated with a second application 176 should be changed at the second data repository 160. The adaptation server 130 can use user profile modifications to anticipate further user profile modification that will benefit operations for a communication device 116 and implement these additional modifications at the second data repository 160 before they are requested. The adaptation server 130 can thereby reduce the need for user intervention in making user profile changes after, for example, the user has upgraded a mobile communication device 116. New capabilities and/or function of the mobile communication device 116 can create a scenario where a global change in user profile information is beneficial. The adaptation server 130 can detect a first change in user profile at the second data repository 160, can determine that this change is due to a usage event, such as the acquisition of a new local communication device 116, and then can propagate this change through a number of user profiles associated with different applications. The adaptation server 130 can then present the newly modified user profile information to the primary data repository 165 for permanent storage.

Figure 3:
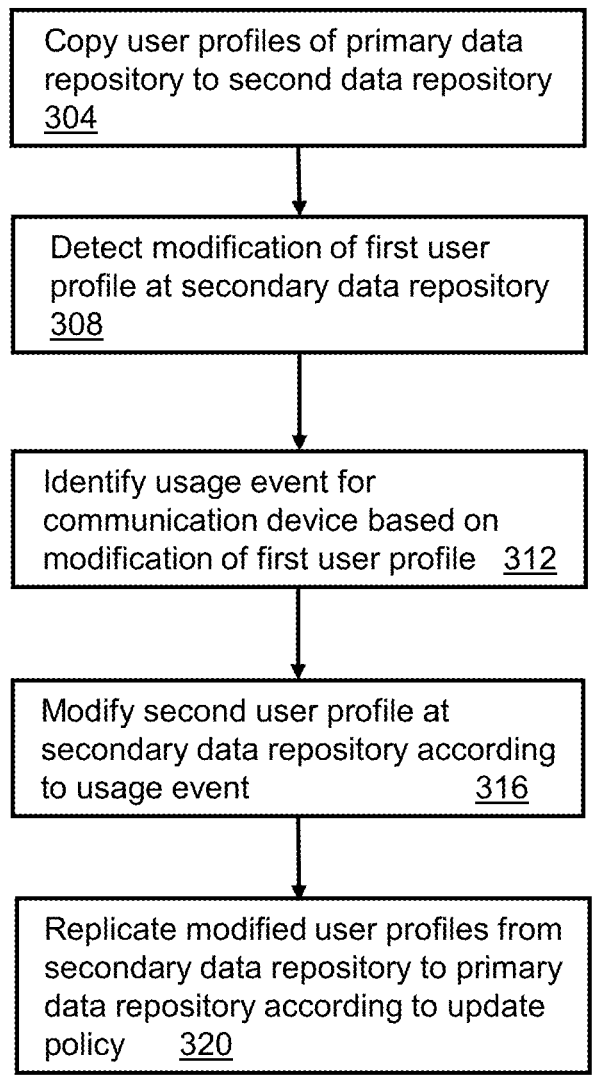
FIG. 3 depicts an illustrative embodiment of a method used in portions of the system described in FIGS. 1-2 and 4-5.
Figure 4:
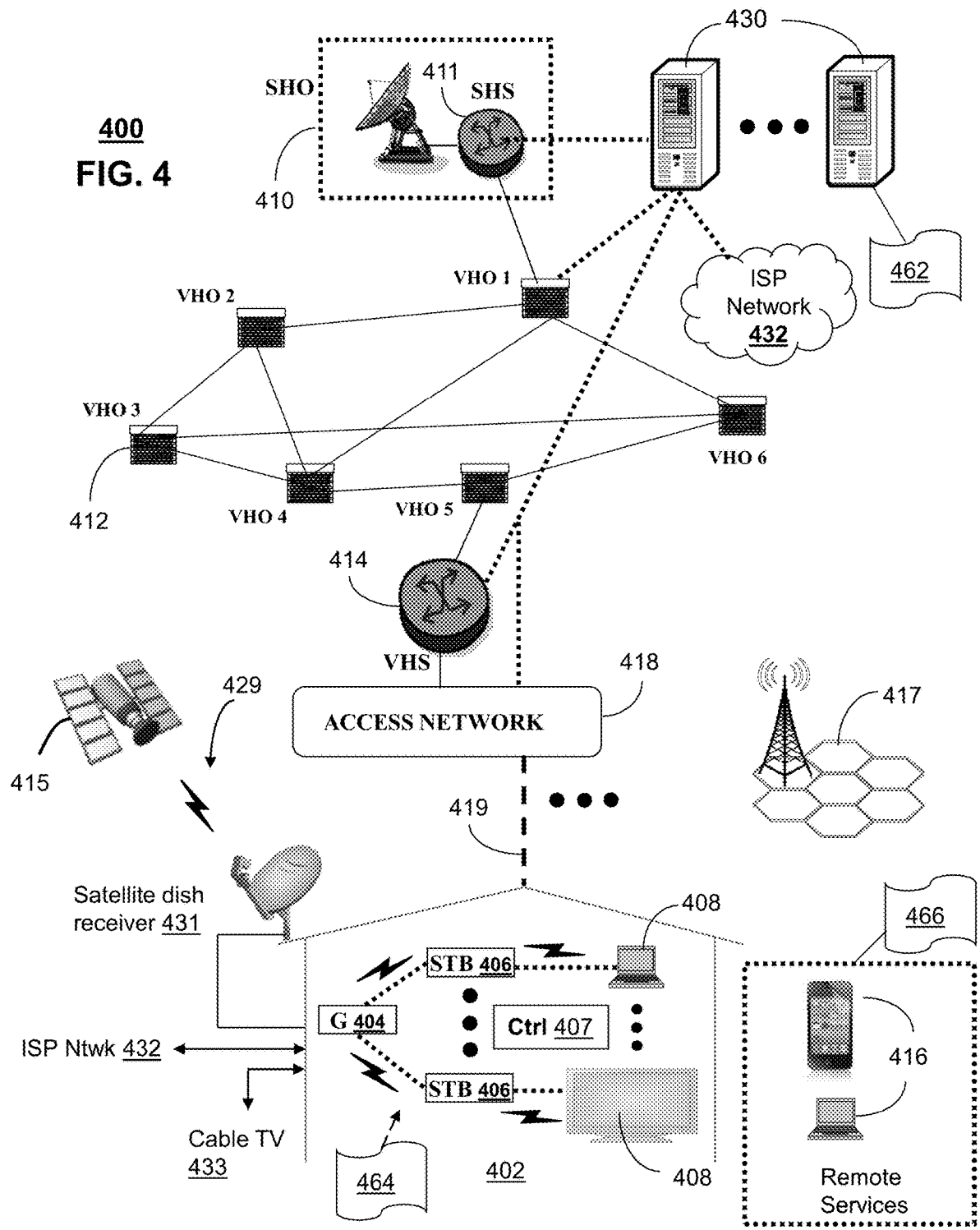
FIGS. 4-5 depict illustrative embodiments of communication systems that provide communication and media services for communication devices according to embodiments illustrated in FIGS. 1-3.
Figure 5:
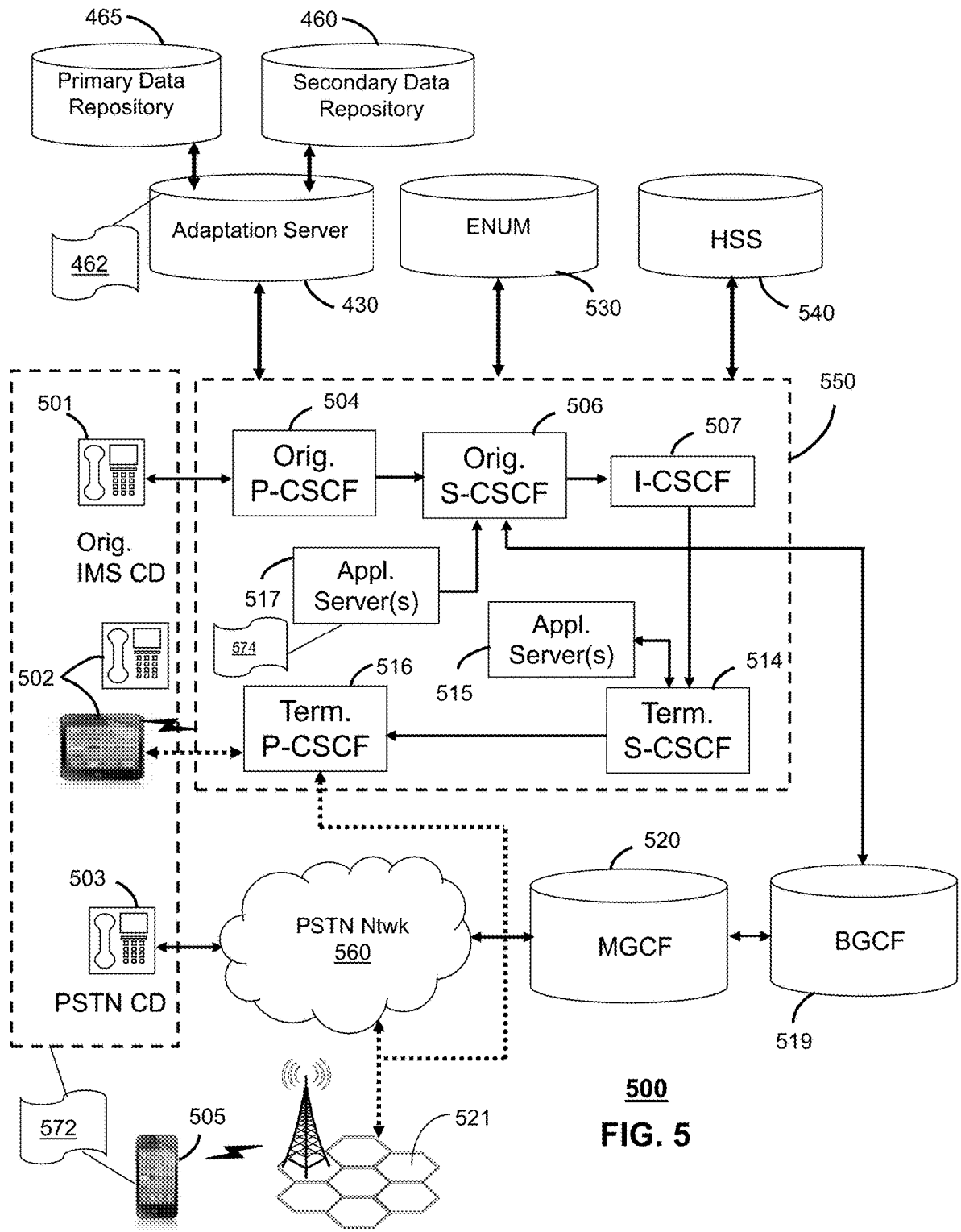

FIG. 3 depicts an illustrative embodiment of a method operating in or using portions of the system described in FIGS. 1, 4, and 5. Method 300 can begin with step 304, in which adaptation server 130 replicates user profile information that is stored at a primary data repository 165 to a secondary data repository 160 of the communication system 100. The user profile information can be associated with services of the communication system 100 or with services of third parties, including those of other communication systems. The adaptation server 130 can replicate selected profile information according to policies and rules 168 four periodically refreshing the contents of the secondary data repository 160.

At step 308, the adaptation server 130 can detect a modification of a user profile at the secondary data repository 160. The adaptation server 130 can monitor user profiles, as well as other information, stored at the secondary data repository 160 changes in the stored information. User profile information can be modified by applications and services within a service provider communication network 150 or applications and services managed by other network providers and/or third-party companies. User profile information can be modified via actions initiated at communication devices 116 of the user and/or via applications 174 accessed using the communication devices 116 via the communications network 150

At step 312, the adaptation server 130 can identify a usage of the four communication device 116 based on a modification of the user profile that has been detected at the secondary data repository 160. Usage events can be identified where a type of user profile and/or modification to that user profile points toward a change in operation at the communications device 116. The adaptation server 130 can infer a usage event by combining contextual information about the communication devices 116 with the detective modification to the user profile.

At step 316, the adaptation server 130 can modify a second user profile at the secondary data repository 160 based on the usage event. The adaptation server 130 can apply rules and policies 168 that link a detect a change in a first user profile at the secondary data repository 162 one or more further modifications in user profile information at the secondary data repository 160. The additional modifications to user profile information at the second data repository 160 can be associated with the same application 174 that generated the detected modification to the user profile or can be associated with a different application 176. The adaptation server 130 can apply rules and policies 168 to detected modifications to user profiles to direct further modification of user profile information at the secondary data repository for specific applications, for specific communication devices 116, and/or for all devices and or applications accessed by the user/subscriber.

At step 320, the adaptation server 130 can replicate user profiles that had been modified at the secondary data repository 160 to the primary data repository 165 according to an update policy 168. The adaptation server 130 can perform a periodic update to ensure that the user profile information at the primary data repository 165 is kept up-to-date with changes to user profile information at the secondary data repository 160. The adaptation server 130 can filter user profile updates such that a safety margin is maintained whereby critical user profile information is quarantined away from automatic update to the primary data repository 165, requires an additional authorization step, and/or requires an additional delay in storage.

In one or more additional embodiments, the adaptation server 130 can predict the behavior of a user by extrapolating a change in user profile at the secondary data repository 160 and/or a determined usage event associated with a communication device of the user. For example, a user can use a computer device 118 to access a first application 174 at a home environment via a gateway device 104 and then switch to a mobile communication device 116 for access to the first application 174 via a cellular network 117. The first application 174 can respond by altering a bandwidth of service to the mobile communication device. For example, where the first application streams content, the altered bandwidth of service can include a streaming codec that is compatible with the lower bandwidth available at the cellular network 117. This change in bandwidth of service can be detected by the adaptation server 130 as a change in a user profile at the secondary data repository 160, where the first application 174 has initiated to change in user profile using an API. In response to the detection of the change in user profile associated with the first application 174, the adaptation server 130 can determine a usage event associated with a user of the computer device 118 and the mobile communications device 116, whereby the user is now "on the go." The inference that the user of the computer device 118 and the mobile communication device 116 is now on the go can further be used by the adaptation server 132 direct a change in security or other services, such as a second application 176, reflective of this usage event. Hence, the adaptation server 130 can cause additional user profiles to be modified at the secondary data repository 160. Plus, the adaptation server 130 can dynamically change security and performance for multiple applications, services, and devices of a user.

In one or more embodiments, the policies and rules 168 that are applied by the adaptation server 130 can be specific to specific users, types of users, and/or levels of subscription. In one or more embodiments, a set of related services, applications, and/or features can be dynamically changed in response to the change of a user profile for any single service, application, and/or feature. For example, a change in profile associated with a home media provider service, such as interactive television or cable television, can cause the adaptation server 130 to change a user profile associated with a home alarm service, a lawn and pool service, or another service related to the home.

In one or more embodiments, where a user purchases a new device 116 with new capabilities and her features, information regarding these new capabilities/features can be transferred to the secondary data repository 160. The adaptation server 130 can detect these changes to the secondary data repository 160 and can replicate these changes to the primary data repository 165 as a permanent upgrade.

In one or more embodiments, the adaptation server 130 can stop propagation of bad profile information from the secondary data repository 162 the primary data repository to define. A "good" user profile at the primary data repository 165 is maintained. When a new user profile is received at the secondary data repository 160, the adaptation server 130 can check this user profile against a set of rules and policies 168 that are enforced for user profile information that is to be stored at the primary data repository 165. Where the set of rules and policies 168 are violated, the adaptation server 130 can prevent the new user profile from being forwarded to the primary data repository 165. Alternatively the adaptation server 130 can prevent the new user profile information from remaining at the secondary data repository 160. In another alternative, the adaptation server 130 can require an additional security measure, such as requiring a user authentication step, before allowing storage of the new user profile at the secondary data repository 160 and or replication of the new user profile at the primary data repository 165. In this way, rules and policies 168 can allow certain changes to be made easily while certain other changes are difficult.

In one or more embodiments, adaptation server 130 can contact a change in user profile associated with a first application 174 at the secondary data repository 160. In response to this change, the adaptation server 130 can notify a communication device 116 of a user that the modification has been detected and can request an acknowledgment and/or an authentication from the user before allowing the modification to remain the secondary data repository 160. In another embodiment, the adaptation server 130 can notify a second application 176 with information regarding the modification to the user profile associated with the first application 174. The second application 176 can proactively suggest a similar modification of user profile to a user.

In one or more embodiments, the application server 130 can generate a report of current user profile settings and/or modifications. The report can be aggregated to conceal personal information. The report can be made available to third parties for data mining. Alternatively third parties can access user profile data at the secondary data repository using an API. A user/subscriber can opt in or opt out from data mining activities involving user profile information stored at the secondary data repository 160 and/or monitored by the adaptation server 130.

FIG. 4 depicts an illustrative embodiment of a first communication system 400 for delivering media content. The communication system 400 can represent an Internet Protocol Television (IPTV) media system. Communication system 400 can be overlaid or operably coupled with the systems of FIGS. 1 and 2 as another representative embodiment of communication system 400. Adaptive server 130, mobile communication device 116, computer device 118, and/or media processor device 106 can be implemented within the communication system 400 for propagating user profile changes.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an adaptation server 430. The adaptation server 430 can use computing and communication technology to perform function 462, which can include among other things, copying user profile information from the primary data repository 165 to the secondary data repository 160, detecting modifications a first user profile information at the secondary data repository 160, identifying usage events for communication devices 116 based on the modification of first user profile, modifying a second user profile at the secondary data repository according to the usage event, and replicating modifications to user profiles from the secondary data repository to the primary data repository according to an update policy 168. For instance, function 462 of server 430 can be similar to the functions described for adaptation server 130 of FIGS. 1-2 in accordance with method 300. The media processors 406 and wireless communication devices 416 can be provisioned with software functions 464 and 466, respectively, to utilize the services of the adaptation server 430. For instance, functions 464 and 466 of media processors 406 and wireless communication devices 416 can be similar to the functions described for the communication devices 106 and 116 of FIGS. 1-2 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 5 depicts an illustrative embodiment of a communication system 500 employing IP Multimedia Subsystem (IMS) network architecture to facilitate the combined services of circuit-switched and packet-switched systems. Communication system 500 can be overlaid or operably coupled with systems 100 and 200 of FIGS. 1 2 and communication system 400 as another representative embodiment of communication system 400. Adaptive server 130, mobile communication device 116, computer device 118, and/or media processor device 106 can be implemented within the communication system 500 for propagating user profile changes.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The adaptation server 430 of FIG. 4 can be operably coupled to communication system 500 for purposes similar to those described above. Adaptation server 430 can perform function 462 and thereby provide user profile services to the CDs 501, 502, 503 and 505 of FIG. 5. For example, CDs 501, 502, 503 and 505, can be adapted with software to perform function 572 to utilize the services of the adaptation server 430 of FIGS. 1-2 in accordance with method 300 of FIG. 3. Adaptation server 430 can be an integral part of the application server(s) 517 performing function 574, which can be substantially similar to function 464 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
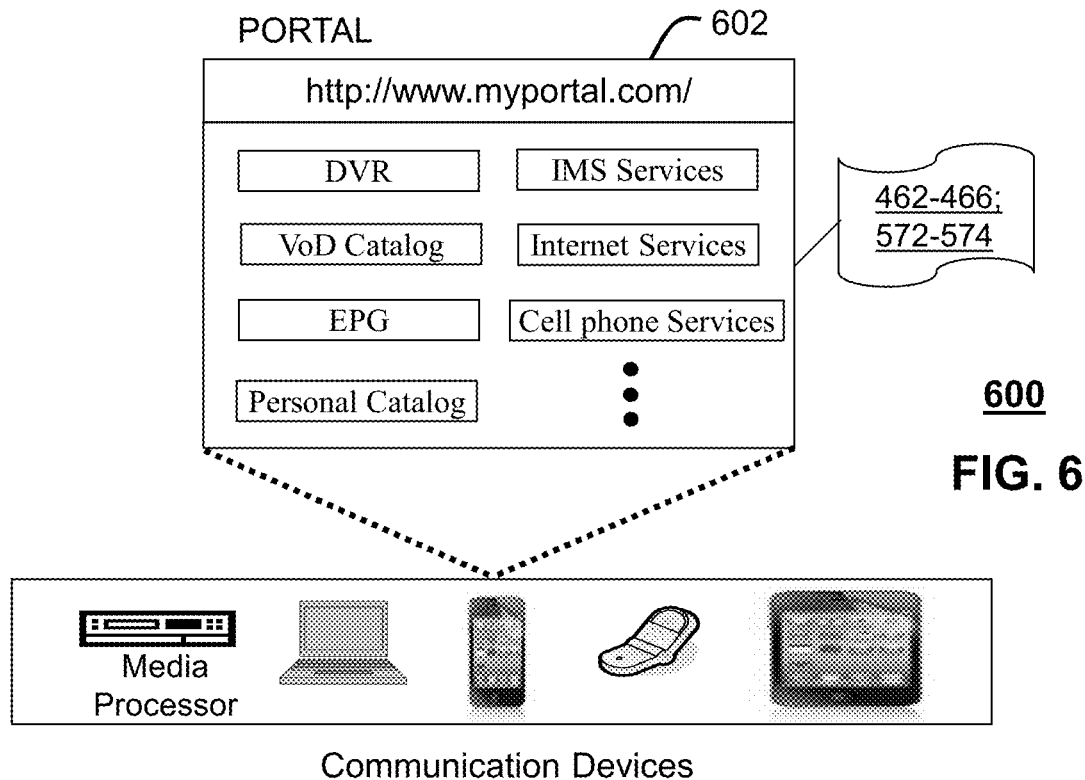
FIG. 6 depicts an illustrative embodiment of a web portal for interacting with the communication systems of FIGS. 1-2 and 4-5.

FIG. 6 depicts an illustrative embodiment of a web portal 602 of a communication system 600. Communication system 600 can be overlaid or operably coupled with systems 100 and 200 of FIGS. 1 and/or 2, communication system 400, and/or communication system 500 as another representative embodiment of systems 100 and 200 of FIGS. 1 and 2, communication system 400, and/or communication system 500. The web portal 602 can be used for managing services of systems 100 and 200 of FIGS. 1 and 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100 and 200 of FIGS. 1 and 2, and communication systems 400-500. For instance, users of the services provided by adaptation server 130 or 430 can log into their on-line accounts and provision the adaptation server 130 or 430 with a user profile that is updated to the secondary data repository to enable communication with devices described in FIGS. 1-5. Service providers can log onto an administrator account to provision, monitor and/or maintain the systems 100 and 200 of FIGS. 1 and 2 or adaptation server 430.

Figure 7:
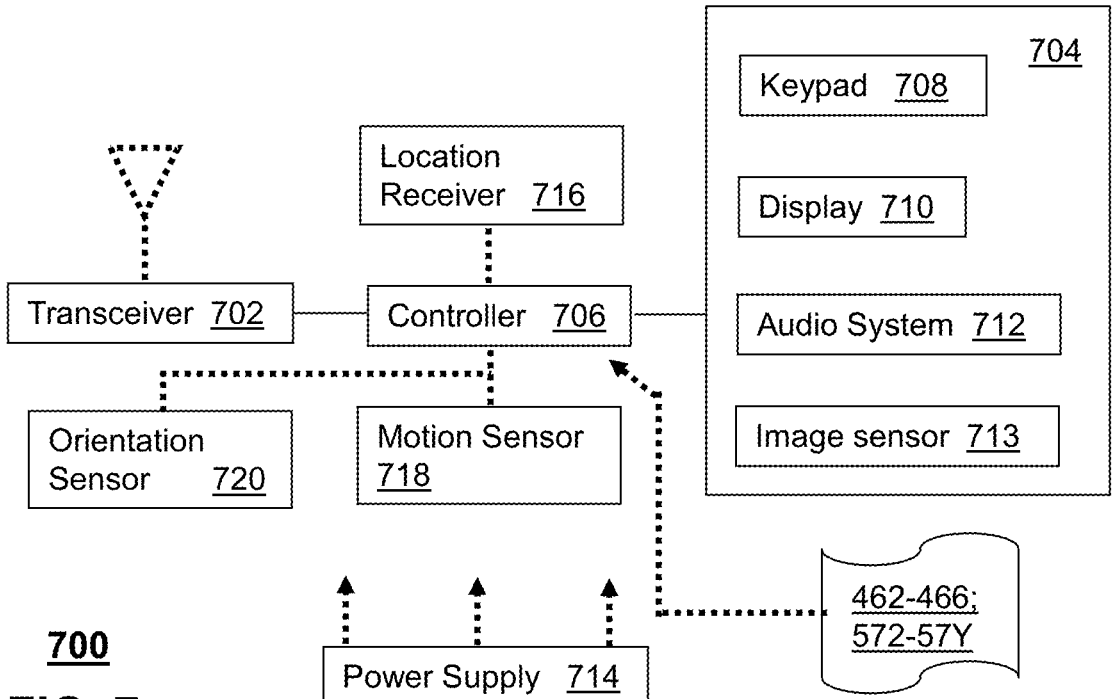
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and 2, and FIGS. 4-5. Communication device 700 in whole or in part can represent any of the communication devices described in FIGS. 1, 2, and 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and 2, communication systems 400-500 of FIGS. 4-5 such as a gaming console and a media player.

The communication device 700 shown in FIG. 7 or portions thereof can serve as a representation of one or more of the devices of system of FIGS. 1 and 2, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
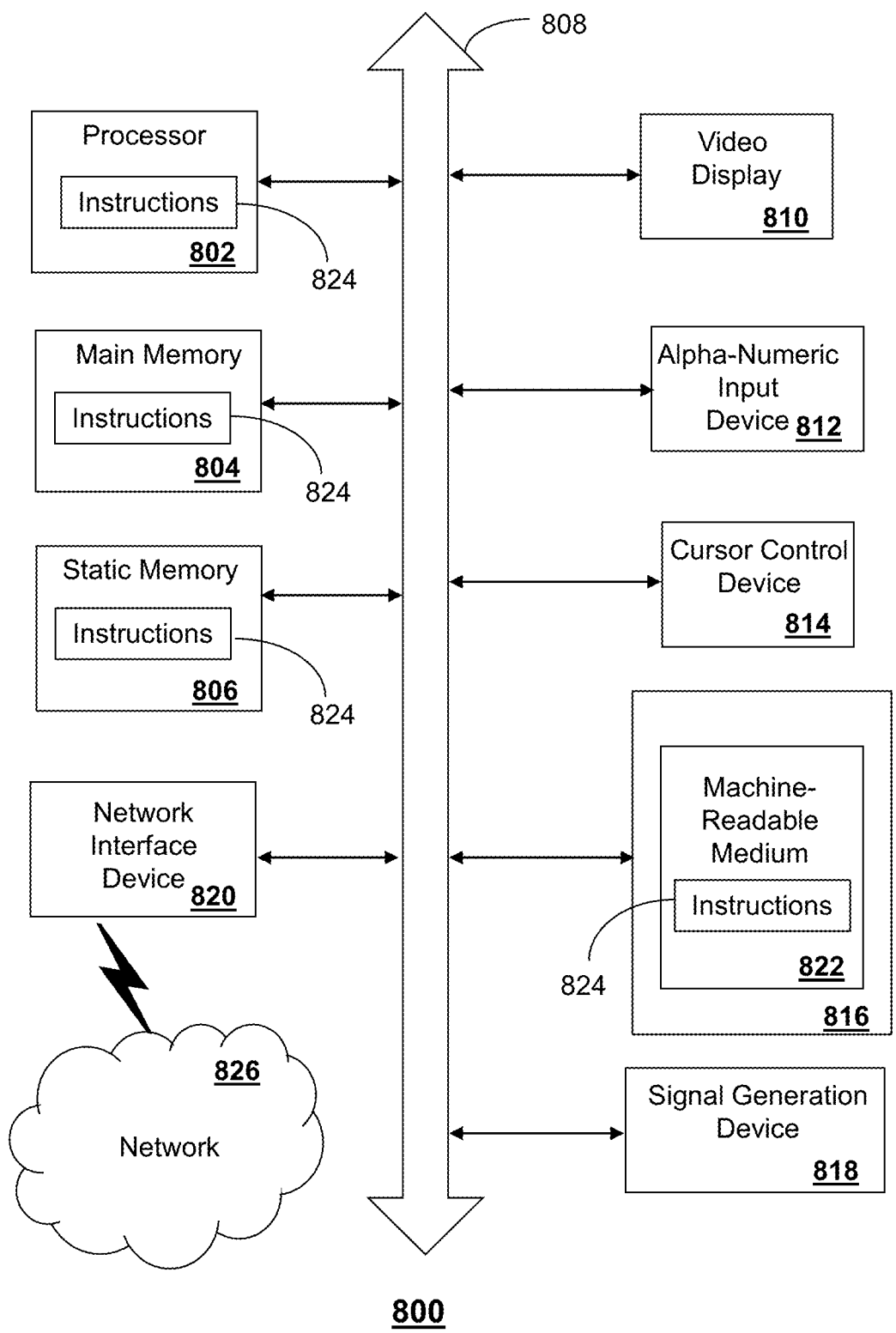
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the adaptation server 130, the media processor 106, the mobile communication device 116, and/or the computer device 118 and other devices of FIGS. 1-2 and 4. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

detecting, by a processing system including a processor, a first modification of a first user profile at a secondary data repository of a communication network, the first modification resulting in a modified first user profile, wherein the first modification of the first user profile is directed by a first application operating at a first communication device, the first application comprising a first third-party application;

identifying, by the processing system, a usage event associated with the first communication device according to the first modification of the first user profile by inferring from the first modification that the usage event has occurred, wherein the usage event comprises a change in an operating condition of the first communication device;

generating, by the processing system according to a change in operation of a second application based on the usage event, a second modification of a second user profile at the secondary data repository, the second modification resulting in a modified second user profile, the second application comprising a second third-party application;

determining, by the processing system, that at least one of the modified first user profile or the modified second user profile conforms to an update policy for a primary data repository separate from the secondary data repository, wherein the primary data repository is not accessible by the first application or by the second application;

replicating, by the processing system in accordance with the determining, the at least one of the modified first user profile or the modified second user profile to the primary data repository;

verifying, by the processing system, authentication information, wherein the replicating is performed responsive to the verifying of the authentication information; and predicting, by the processing system, a behavior of a user of the first communication device by extrapolating the first modification of the first user profile at the secondary data repository, the identified usage event, or both.

2. The method of claim 1, wherein the first modification is due to a change in streaming of media content to the first communication device.

3. The method of claim 1, wherein the usage event is associated with movement of the first communication device from a first location to a second location.

4. The method of claim 1, wherein the first application directs the first modification of the first user profile via an open application programming interface.

5. The method of claim 1, wherein the generating the second modification of the second user profile comprises modifying a security profile for the second application.

6. The method of claim 1, wherein the second application operates at a second communication device.

7. The method of claim 6, further comprising:

receiving, by the processing system, the authentication information from the second communication device responsive to determining that the modified second user profile violates the update policy.

8. The method of claim 1, wherein the identifying the usage event is performed using contextual information regarding the first communication device.

9. The method of claim 1, wherein the usage event is associated with a change in service to the first communication device, a change in capabilities of the first communication device, or a combination thereof.

10. The method of claim 1, wherein the second modification includes a limitation on authentication attempts associated with the second application.

11. A device, comprising:

a processing system including a processor; and a memory that stores executable instructions that, when executed by the processing system, facilitate performance of operations comprising:

detecting a first modification of a first user profile at a secondary data repository of a communication network, the first modification resulting in a modified first user profile, wherein the first modification of the first user profile is directed by a first application operating at a first communication device, the first application comprising a first third-party application;

identifying a usage event associated with the first communication device according to the first modification of the first user profile by inferring from the first modification that the usage event has occurred, wherein the usage event comprises a change in an operating condition of the first communication device;

generating, according to a change in operation of a second application based on the usage event, a second modification of a second user profile at the secondary data repository, the second modification resulting in a modified second user profile, the second application comprising a second third-party application;

determining that at least one of the modified first user profile or the modified second user profile conforms to an update policy for a primary data repository separate from the secondary data repository, wherein the primary data repository is not accessible by the first application or by the second application;

replicating, in accordance with the determining, the at least one of the modified first user profile or the modified second user profile to the primary data repository;

verifying authentication information, wherein the replicating is performed responsive to the verifying of the authentication information; and predicting a behavior of a user of the first communication device by extrapolating the first modification of the first user profile at the secondary data repository, the identified usage event, or both.

12. The device of claim 11, wherein the second modification includes a limitation on authentication attempts associated with the second application.

13. The device of claim 11, wherein the generating the second modification of the second user profile comprises modifying a security profile for the second application.

14. The device of claim 11, wherein the second application operates at a second communication device, and wherein the operations further comprise:

receiving the authentication information from the second communication device responsive to determining that the modified second user profile violates the update policy.

15. The device of claim 11, wherein the usage event is associated with movement of the first communication device from a first location to a second location.

16. The device of claim 11, wherein the first application directs the first modification of the first user profile via an open application programming interface.

17. A non-transitory machine-readable medium comprising a memory that stores executable instructions that, when executed by a processing system including a processor, facilitate performance of operations comprising:

detecting a first modification of a first user profile at a secondary data repository of a communication network, the first modification resulting in a modified first user profile, wherein the first modification of the first user profile is directed by a first application operating at a first communication device, the first application comprising a first third-party application;

identifying a usage event associated with the first communication device according to the first modification of the first user profile by inferring from the first modification that the usage event has occurred, wherein the usage event comprises a change in an operating condition of the first communication device;

generating, according to a change in operation of a second application based on the usage event, a second modification of a second user profile at the secondary data repository, the second modification resulting in a modified second user profile, the second application comprising a second third-party application;

determining that at least one of the modified first user profile or the modified second user profile conforms to an update policy for a primary data repository separate from the secondary data repository, wherein the primary data repository is not accessible by the first application or by the second application;

replicating, in accordance with the determining, the at least one of the modified first user profile or the modified second user profile to the primary data repository;

verifying authentication information, wherein the replicating is performed responsive to the verifying of the authentication information; and predicting a behavior of a user of the first communication device by extrapolating the first modification of the first user profile at the secondary data repository, the identified usage event, or both.

18. The non-transitory machine-readable medium of claim 17, wherein the second modification includes a limitation on authentication attempts associated with the second application.

19. The non-transitory machine-readable medium of claim 17, wherein the first application directs the first modification of the first user profile via an open application programming interface.

20. The non-transitory machine-readable medium of claim 17, wherein the secondary data repository is accessible by a third party application and wherein the primary data repository is not accessible by the third party application.

* * * * *